US012589805B2

(12) United States Patent
Garceau et al.

(10) Patent No.: US 12,589,805 B2
(45) Date of Patent: Mar. 31, 2026

(54) SPRING HANGER FOR TRAILER FRAME

(71) Applicant: NORCO INDUSTRIES, INC.,
Compton, CA (US)

(72) Inventors: Bernard F. Garceau, Vandalia, MI
(US); William A. Aske, Cassopolis, MI
(US); Leonard D. Yoder, Elkhart, IN
(US)

(73) Assignee: NORCO INDUSTRIES, INC.,
Compton, CA (US)

( * ) Notice: Subject to any disclaimer, the term of this
patent is extended or adjusted under 35
U.S.C. 154(b) by 0 days.

(21) Appl. No.: 19/013,685

(22) Filed: Jan. 8, 2025

(65) Prior Publication Data

US 2025/0145220 A1 May 8, 2025

Related U.S. Application Data

(63) Continuation of application No. 18/354,900, filed on
Jul. 19, 2023, now Pat. No. 12,221,158, which is a
(Continued)

(51) Int. Cl.
B62D 21/11 (2006.01)
B62D 21/20 (2006.01)

(52) U.S. Cl.
CPC .............. B62D 21/11 (2013.01); B62D 21/20
(2013.01); B60G 2206/601 (2013.01)

(58) Field of Classification Search
CPC ........ B60G 2206/601; B60G 2204/121; B60G
2204/4302; B60G 11/02; B60G 2300/04;
(Continued)

(56) References Cited

U.S. PATENT DOCUMENTS

| | | | | |
|---|---|---|---|---|
| 5,536,035 | A | 7/1996 | Bautz et al. | |
| 6,296,418 | B1 * | 10/2001 | Birkwald | B60G 99/004 |
| | | | | 403/11 |

(Continued)

FOREIGN PATENT DOCUMENTS

| | | |
|---|---|---|
| JP | 09156336 A | 6/1997 |
| JP | 11034912 A | 2/1999 |

(Continued)

OTHER PUBLICATIONS

Machine translation of JP2001219726A (JP; Uchiyama, H.; published Aug. 14, 2001); translation obtained Aug. 15, 2025. (Year: 2025).*

(Continued)

*Primary Examiner* — Laura Freedman
(74) *Attorney, Agent, or Firm* — Vorys, Sater, Seymour
and Pease LLP; Rex W. Miller, II

(57) ABSTRACT

A hanger assembly may comprise a first hanger section and a second hanger section, formed and shaped to increase the stiffness and strength of the assembly. The first hanger section may include a first surface and a first tab portion wherein the first tab portion extends in a first direction and wherein the first surface faces a second direction that is opposite the first direction. The second hanger section may include a second surface and a second tab portion, wherein the second surface is configured to abut the first surface. The spring hanger assembly may be attached to a frame using fasteners or hucks.

20 Claims, 5 Drawing Sheets

Related U.S. Application Data continuation of application No. 17/497,520, filed on Oct. 8, 2021, now Pat. No. 11,745,799.

(60) Provisional application No. 63/091,088, filed on Oct. 13, 2020.

(58) Field of Classification Search
CPC .......... B60G 2202/11; B60G 2202/112; B62D 21/11; B62D 21/20
See application file for complete search history.

(56) References Cited

U.S. PATENT DOCUMENTS

| | | | | |
|---|---|---|---|---|
| 6,425,593 | B2 * | 7/2002 | Fabris | B60G 9/003 |
| | | | | 280/124.1 |
| 6,932,388 | B2 | 8/2005 | Few et al. | |
| 8,523,207 | B2 * | 9/2013 | Dodd | B60G 9/00 |
| | | | | 180/209 |
| 9,315,083 | B2 * | 4/2016 | Noble | B60G 9/02 |
| 11,148,494 | B2 * | 10/2021 | Herve | F16F 1/26 |
| 11,745,799 | B2 | 9/2023 | Garceau et al. | |
| 12,221,158 | B2 * | 2/2025 | Garceau | B62D 21/11 |
| 2018/0029647 | A1 | 2/2018 | Garceau | |
| 2022/0176763 | A1 | 6/2022 | Ramasamy et al. | |

FOREIGN PATENT DOCUMENTS

| | | | | |
|---|---|---|---|---|
| JP | 11078456 A | | 3/1999 | |
| JP | 11099958 A | | 4/1999 | |
| JP | 2000108624 A | | 4/2000 | |
| JP | 2001219726 A | * | 8/2001 | |
| JP | 2002264623 A | * | 9/2002 | |
| KR | 20100038993 A | * | 4/2010 | B60G 11/02 |

OTHER PUBLICATIONS

Machine translation of JPH09156336A (JP; Sasaki, K; published Jun. 17, 1997); translation obtained Aug. 14, 2025. (Year: 2025).*

* cited by examiner

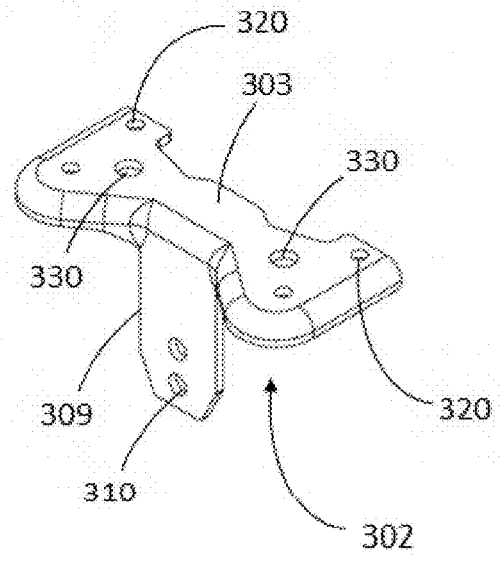
FIG. 3A
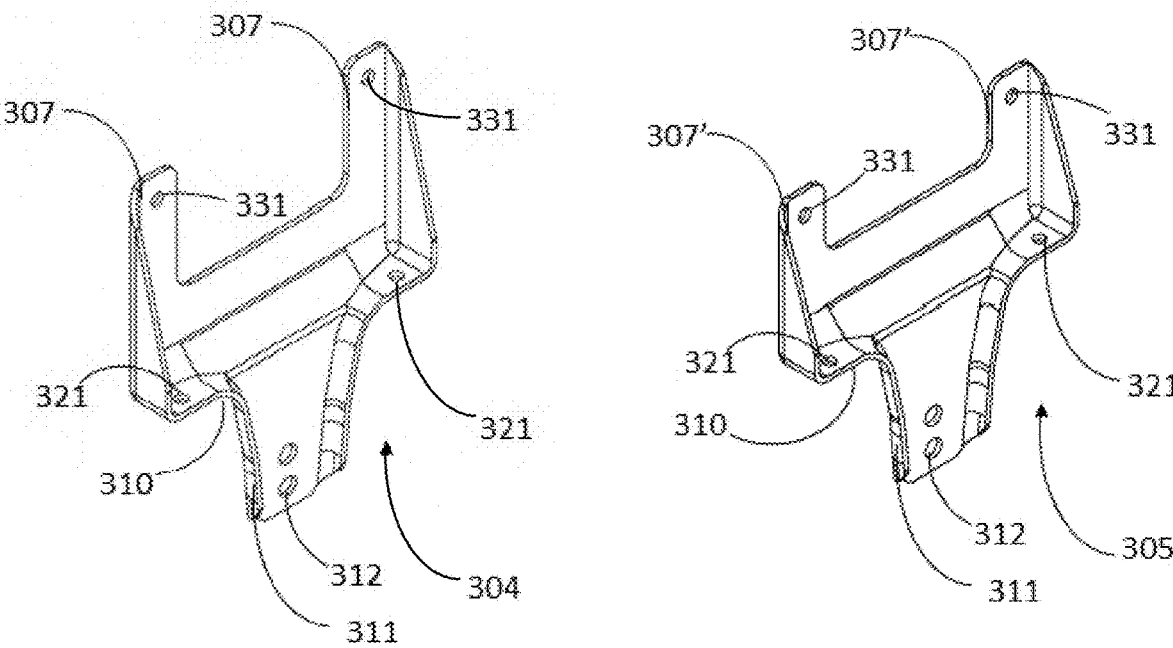
FIG. 3B                                                                FIG. 3C

SPRING HANGER FOR TRAILER FRAME

CROSS REFERENCE TO RELATED APPLICATIONS

This application is a continuation of U.S. patent application Ser. No. 18/354,900 filed Jul. 19, 2023, which is a continuation of U.S. patent application Ser. No. 17/497,520 filed Oct. 8, 2021, which claims priority to U.S. Provisional Patent Application Ser. No. 63/091,088 filed Oct. 13, 2020, each of which is herein incorporated by reference in its entirety.

BACKGROUND

The present disclosure is related to vehicle frame assembly systems and, more particularly, to spring hangers that can be used with vehicle frames.

Spring hangers, also known as axle hangers, may be utilized in a variety of vehicle frames. For example, spring hangers may be utilized with trailer frames including those described in United States Patent Application Publication No. US2018/0029647, which is incorporated by reference herein in its entirety. Generally, spring hangers are U-brackets with simple one piece braces welded directly to the frame.

The present disclosure provides spring hangers with improved stiffness and strength and that are attached to the frame rail using fasteners. These and other advantages will be understood by those with skill in the art.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In accordance with some aspects of the present disclosure a spring hanger assembly is described. A hanger assembly includes a first hanger section having a first surface and a first tab portion, wherein the first tab portion extends in a first direction and wherein the first surface faces a second direction that is opposite the first direction. The spring hanger assembly also includes a second hanger section having a second surface and a second tab portion wherein the second surface is configured to abut the first surface. In a further embodiment, the first hanger section further comprises a recess, wherein the second tab portion occupies a portion of the recess when the second hanger section is joined with the first hanger section. In another further embodiment, the first tab portion and the second tab portion are configured to mount a suspension component therebetween. In another further embodiment, the first direction is substantially perpendicular to the first surface. In another further embodiment, the first surface further comprises a tongue extending into the recess. In another further embodiment, the second hanger section further comprises at least one finger portion extending from the second surface in a direction opposite the second tab portion. In another further embodiment, the first surface includes a first set of mounting holes. In another further embodiment, a portion of the first surface and a side surface of the at least one finger together define a seat configured to receive a structure for mounting the hanger assembly.

In accordance with another aspect of the present disclosure a spring hanger assembly system is described. An exemplary hanger assembly includes an inner hanger section having a top surface and a first tab portion, wherein the first tab portion extends in a first direction. The spring hanger assembly also includes an outer hanger section having a bottom surface, a second tab portion, and a finger portion, wherein the bottom surface abuts the top surface and wherein the finger portion extends from the bottom surface in a direction opposite the second tab portion. In a further embodiment, the finger portion and the top surface together define a seat for mounting the hanger assembly. In another further embodiment, the hanger assembly comprises a recess in the top surface, where the second tab portion occupies a portion of the recess when the outer hanger section is joined with the inner hanger section. In another further embodiment, the top surface further comprises a tongue extending into the recess. In another further embodiment, the top surface includes a first set of mounting holes. In another further embodiment, the bottom surface is welded to the top surface. In another further embodiment, the first tab portion has a first hole that corresponds with a second hole positioned in the second tab portion.

In another embodiment, a hanger assembly is disclosed, wherein the hanger assembly comprises an inner hanger section having a recess defined in a top surface of the inner hanger section, and a first tab portion. The hanger assembly further comprises an outer hanger section having a bottom surface, a second tab portion, and a finger portion, wherein the finger portion and the top surface together define a seat configured to receive a structure for mounting the hanger assembly. In a further embodiment, the hanger assembly comprises a recess in the top surface, wherein the second tab portion occupies a portion of the recess when the outer hanger section is joined with the inner hanger section. In another further embodiment, the top surface further comprises a tongue extending into the recess. In another further embodiment, the top surface includes a first set of mounting holes, and wherein the finger portion includes a second set of mounting holes for the mounting of the hanger assembly. In another further embodiment, the first tab portion has a first hole that corresponds with a second hole positioned in the second tab portion, and wherein the first hole and the second hole are configured to receive a fastener.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 3A is a perspective view of an exemplary inner section of a spring hanger in accordance with the present disclosure.

FIG. 3B is a perspective view of an exemplary outer section of a spring hanger in accordance with the present disclosure.

FIG. 3C is a perspective view of another exemplary outer section of a spring hanger in accordance with the present disclosure.

DETAILED DESCRIPTION

Figure 1:
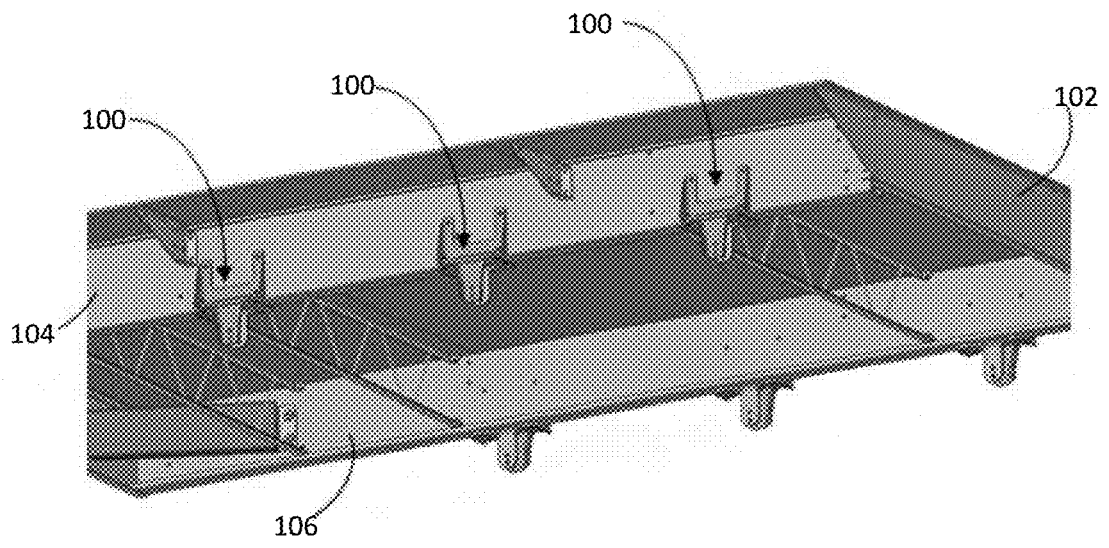
FIG. 1 is a perspective view of an exemplary trailer frame including spring hangers in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

A plurality of spring hangers may be provided on a frame. FIG. 1 illustrates a perspective bottom view of an exemplary arrangement of spring hangers 100 on a trailer frame 102, according to one or more embodiments of the present disclosure. The depicted trailer frame 102 is just one example frame that can suitably incorporate the principles of the present disclosure. Indeed, many alternative designs and configurations of the frame 102 may be employed, without departing from the scope of this disclosure.

Figure 2:
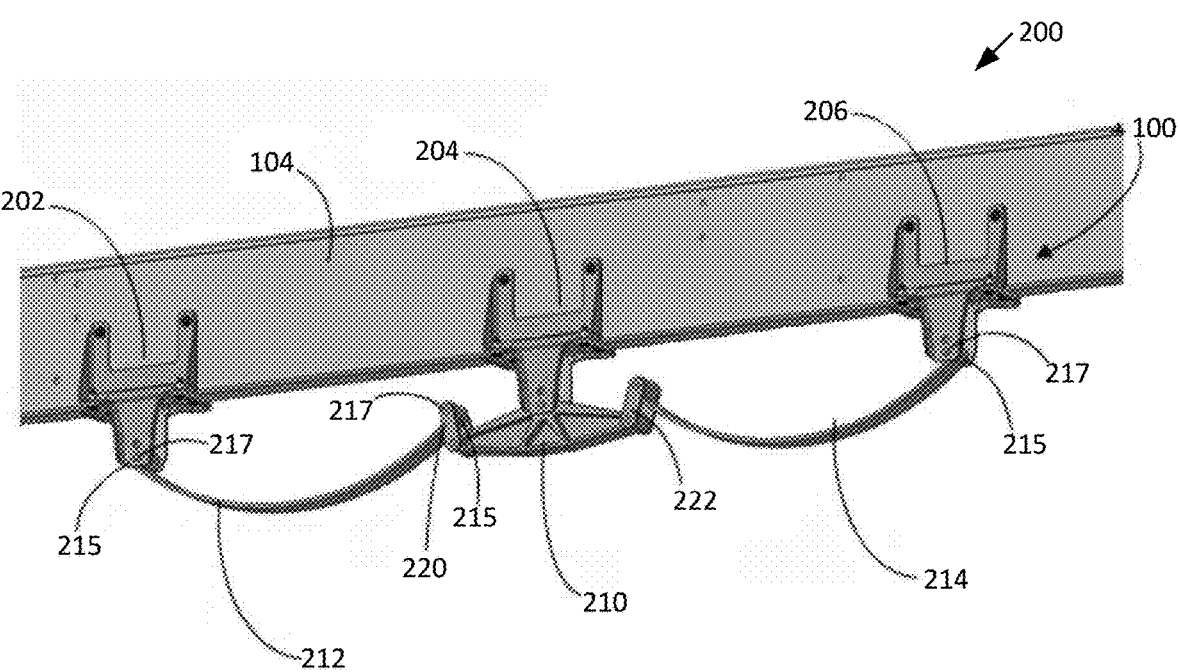
FIG. 2 is a perspective view of an exemplary spring hanger suspension system in accordance with the present disclosure.

With reference to FIGS. 1 and 2, the frame 102 includes a first rail 104 and a second rail 106 extending along a length of a trailer. A spring hanger system 200 may include a plurality of spring hangers 100 aligned along each of the first and second rails 104, 106. In the exemplary embodiments, three (3) spring hangers 100 are provided on each rail 104, 106. However, it is to be appreciated that more or less than three (3) of the spring hangers 100 may be aligned on the first rail 104 and/or the second rail 106.

Spring hangers 100 may be configured to receive various vehicle suspension components. The depicted suspension components FIG. 2 are just one example of suspension components that may be suitably incorporated with the principles of the present disclosure. Indeed, many alternative designs and configurations of suspension components may be employed, without departing from the scope of this disclosure.

As illustrated, the spring hanger assembly system 200 including spring hangers 100 include a left spring hanger 202, a central spring hanger 204, and a right spring hanger 206. Here, an equalizer 210 is attached to the central spring hanger 204. A first leaf spring 212 is arranged between the left spring hanger 202 and the central spring hanger 204, and a second leaf spring 214 is arranged between the right spring hanger 206 and the central spring hanger 204. Each of the first and second leaf springs 212,214 include loops formed at their ends 215 respectively that are configured to couple the first and second leaf springs 212,214 to the spring hangers 100. That is, a fastener 217 may thread through both holes in the hanger 100/suspension component, e.g., shackles 220,222 of equalizer 210, and the end 215 loop of the leaf spring 212, 214, securing each leaf spring 212, 214 to the rail. While not illustrated, wheel assemblies may be installed to the first and second leaf springs 212,214. The length between the left spring hanger 202, the central spring hanger 204, and the right spring hanger 206 may vary depending upon the desired distance between the front and rear wheel assemblies. A left and right shackle 220,222 are provided on the left and right side, respectively, of the equalizer 210, and the left and right shackle 220,220 couple the first and second leaf springs 212,214 to the equalizer 210.

The loop at a first end of the first leaf spring 212 is bolted to the left spring hanger 202 and the loop at the opposing second end of the first leaf spring 212 is bolted to the left shackle 220. The loop at a first end of the second leaf spring 214 is bolted to the right spring hanger 206 and the loop at the opposing second end of the second leaf spring 214 is bolted to the right shackle 222. The equalizer 210 is configured to rock back and forth in the central spring hanger 204, and the shackles 220, 222 coupled to the equalizer 210 permit the leaf springs 212,214 travel axially along the length of the rails, towards and away from the central spring hanger 204, thereby permitting load from the axle to transfer into the suspension.

In accordance with the present disclosure, a spring hanger 100, includes of two sections, an inner and outer section. FIGS. 3A-3C illustrate various embodiments of spring hanger 100 sections. An inner hanger section 302 is illustrated in FIG. 3A and outer hanger sections 304 and 305 are illustrated in FIGS. 3B and 3C. The inner hanger section 302 includes a substantially planar top surface 303 configured to abut and mount a bottom surface of a rail 104, 106. The planar top surface 303 also provides a surface for receiving the outer hanger section 304, 305, discussed in greater detail below. The inner hanger section 302 also includes an inner tab portion 309 extending substantially perpendicular to the top surface 303. The inner tab portion 309 includes at least one hole configured to receive a fastener for securing suspension components, e.g., leaf spring, equalizer, etc., in cooperation with corresponding holes on an outer tab portion of an outer hanger section 304, 305.

As illustrated, the outer hanger section 304 includes at least one finger 307 that is configured to abut an exterior surface of the rail 104, 106. The exemplary embodiments of FIGS. 3B and 3C show two (2) spaced apart fingers 307, 307'. These fingers 307, 307' may extend substantially perpendicular to a bottom surface 310 of the outer hanger 304, 305. The fingers 307 are configured to extend along a vertical dimension of the rail 104, 106. The fingers 307, 307' may extend vertically at least half way upward along the rail 104, 106, up to about the upper third of the vertical portion of the rail 104, 106. Providing the spring hanger outer hanger section 304 with fingers 307 that extend too high vertically on the rail portion may stiffen the assembly and may result in cracking or other damage; however, providing the fingers 307' too low vertically on the rail portion may result in too much flexibility and may also result in cracking. Thus, in some embodiments, the inner hanger section 302 is provided with standard dimensions, whereas different outer hanger sections 304, 305 may be provided with different finger 307, 307' dimensions.

As mentioned, the outer hanger sections 304, 305 include a substantially planar bottom surface 310 configured to abut the top surface 303 of the inner hanger section 302. Each surface 303, and 310 may have corresponding holes for receiving a fastener for joining the inner hanger section 302 to an outer hanger section 304, 305. The outer hanger section 304, 305, also includes an outer tab portion 311 extending substantially perpendicular to the bottom surface 310 and in an opposite direction from fingers 307, 307'. The outer tab portion 311 includes at least one hole 312 configured to receive a fastener for securing suspension components, e.g., leaf spring, equalizer, etc., in cooperation with corresponding holes 310 on the inner tab portion 309 of the inner hanger section 302.

Figure 4A:
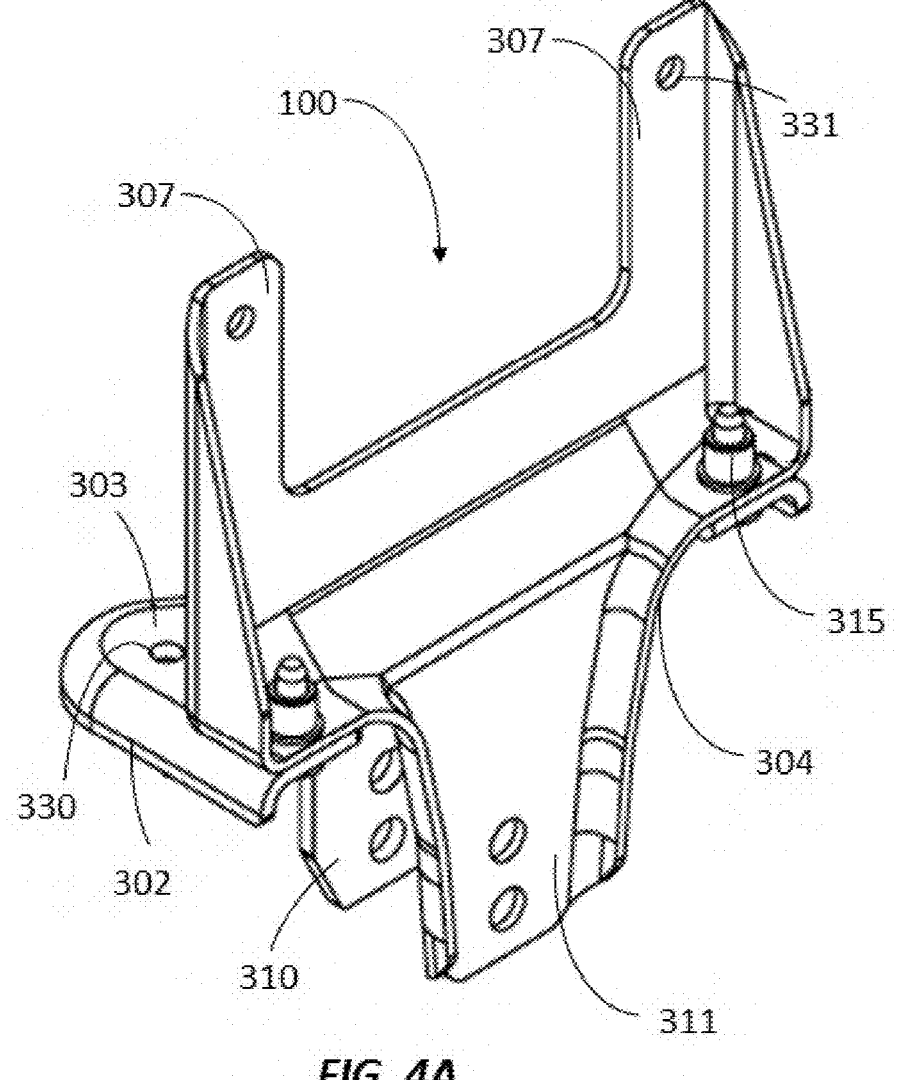
FIG. 4A is a perspective view of an exemplary spring hanger assembly in accordance with the present disclosure.
Figure 4B:
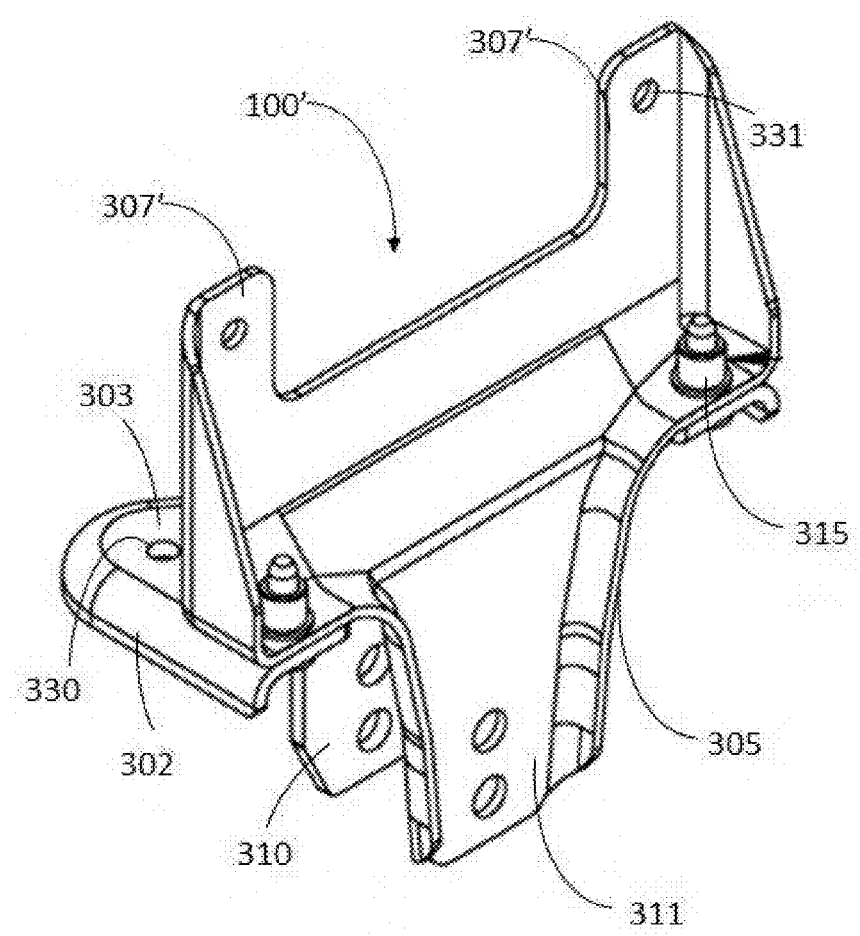
FIG. 4B is a perspective view of another spring hanger assembly in accordance with the present disclosure.

As illustrated in FIGS. 4A and 4B, an inner hanger section 302 may be joined with an outer hanger section, e.g., outer hanger section 304 and/or outer hanger section 305 as a spring hanger assembly 100, 100'. The hanger sections may be in a variety of manners, for example, they may be welded together, bolted together, or hucked together. In the illustrated embodiment of FIG. 4A, spring hanger assembly 100 includes inner hanger section 302 hucked together with outer section 304. As appreciated by those skilled in the art, Huck® fasteners are vibration resistant fasteners including a two-piece grooved pin and a collar combo where the collar sits over the pin and is compressed into the grooves of the pin via a designated tool. The tool presses the softer material collar into the pin making the two-piece combo an integrated one-piece entity. In the illustrated embodiment of FIG. 4B, spring hanger assembly 100' includes inner hanger section 302 hucked together with outer section 305. Also, when inner hanger section 302 and the outer hanger section 304, 305 are joined together, the fingers 307, 307' and bottom surface 303 define a seat that receives a portion of a rail 104.

As mentioned, the outer hanger section may be provided with different finger dimensions to accommodate frames having differently sized rails. FIG. 4A illustrates an example of the outer hanger section 304 having a pair of relatively longer fingers 307, whereas FIG. 4B illustrates an example of the outer hanger section 305 having a pair of shorter fingers 307' relative to those illustrated in FIG. 4A.

Figure 5:
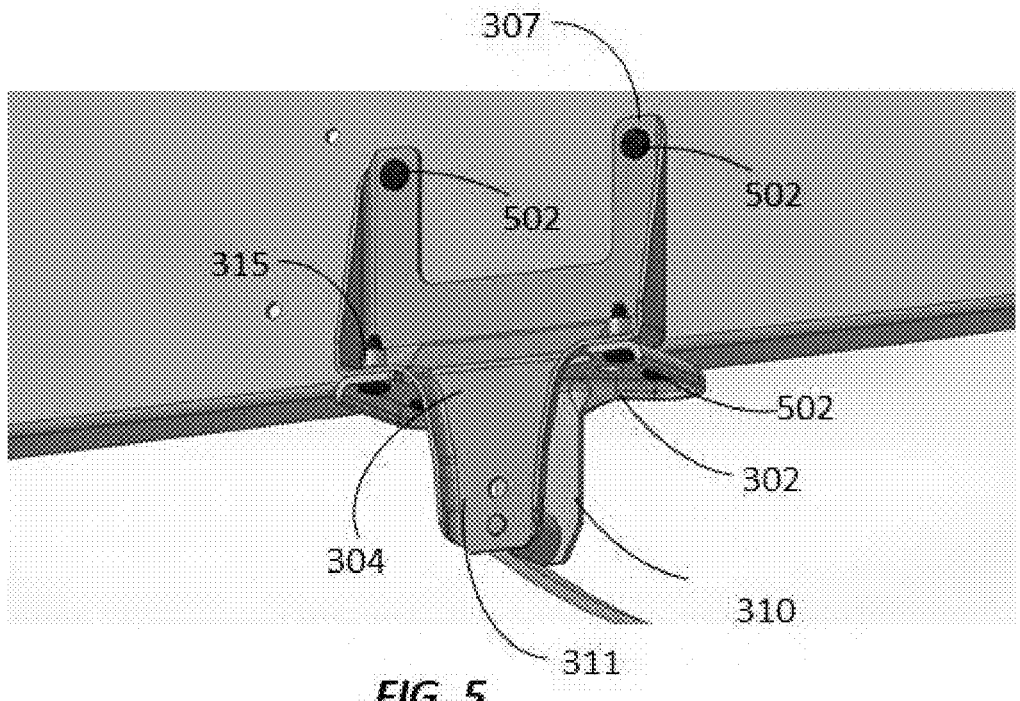
FIG. 5 illustrates a spring hanger assembly installs to a frame rail.

FIG. 5 illustrates a spring hanger utilizing the outer hanger section 304 with longer fingers 307. The inner hanger section 302 and the outer hanger section 304 are hucked together with a pin and collar fastener 315. As illustrated in FIGS. 3A-3C, each of the inner hanger section 302 and the outer hanger section 304 includes a pair of assembly holes 320, 321, with the assembly holes 320 of the inner hanger section 302 corresponding to the assembly holes 321 of the outer hanger section 304, 305 when they are assembled together. The pin and collar fastener 315 may then be utilized to secure the inner hanger section 302 and the outer hanger section 304, 305 together. In other examples, however, the inner hanger section 302 and the outer hanger section 304, 305 need not include such assembly holes, for example, where the inner hanger section 302 and the outer hanger section 304, 305 are welded together.

With continued reference to FIGS. 3-5, each of the inner hanger section 302 and the outer hanger section 304, 305 include various mounting holes 330, 331 for securing the spring hanger assembly 100 to a rail 104, 106. For example, the inner hanger section 302 may include mounting holes 330 on its top surface 303 and the outer hanger section 304 may include mounting holes 331 on the fingers 307, 307' for attachment to the rail of the frame. As illustrated in FIG. 5, the spring hanger assembly 100 is attached to the rail 104 via fasteners 502 through mounting holes 330 and 331.

Figure 6A:
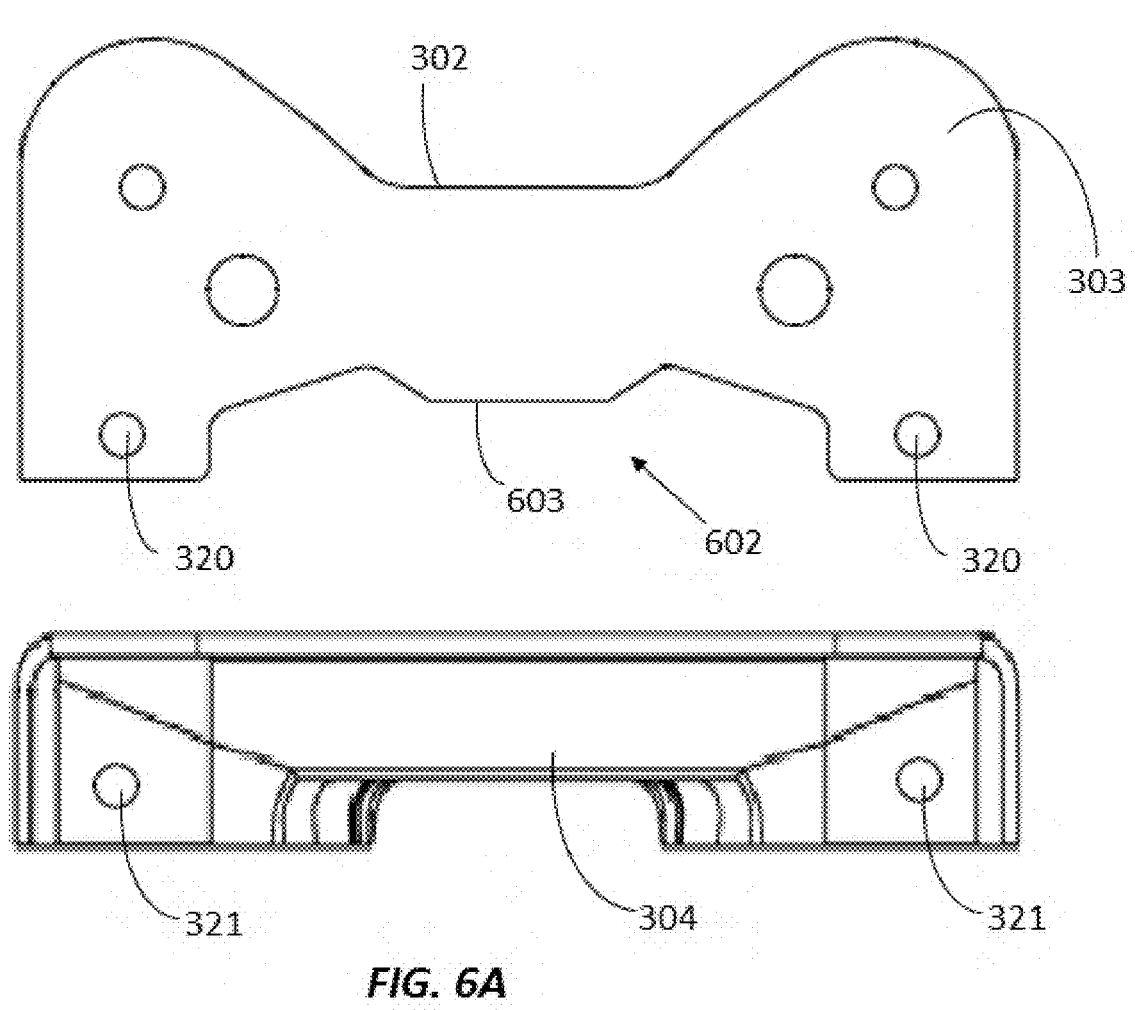
FIG. 6A is a top view of inner and outer spring hanger sections.
Figure 6B:
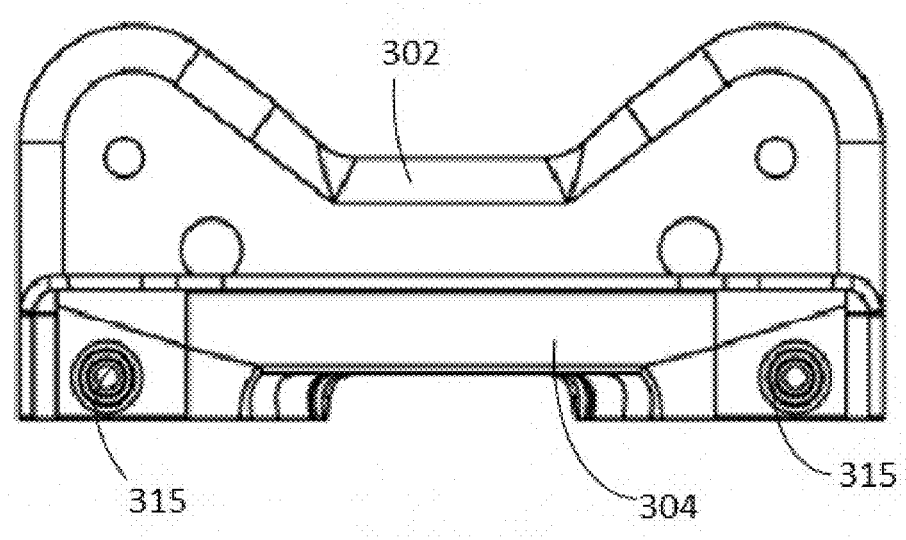
FIG. 6B is a top view of the inner and outer spring hanger sections in a joined configuration

FIGS. 6A and 6B illustrate top view of inner 302 and outer hanger sections 304, 305 separate and joined, respectively. In some embodiments, the inner hanger section 302 includes a recess 602 configured to receive a portion of an outer hanger section 304, 305. The recess 602 is substantially U-shaped and is carved through of the top surface 303 about the side configured to engage the outer hanger section 304, 305. The bottom extending outer tab 311 of the outer section 304 occupies a portion of the recess 602 when the inner hanger section 302 is joined with the outer hanger section 304,305 (as illustrated in FIG. 6A). In some embodiments, the inner hanger section 302 includes a tongue portion 603 of the top surface 303 that projects outwardly therefrom and into the recess 602. The tongue portion 603 may abut an inner facing surface (occluded) of the bottom tab 311. In this way, the tongue portion 603 may aid in maintaining a spaced apart relationship between the bottom tab 310 of the inner hanger section 302 and the bottom tab 311 of the outer hanger section 304, 305.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A hanger assembly, comprising:
a first hanger section that includes a first surface and a first tab portion defining a first mounting hole, wherein the first tab portion extends in a first direction and wherein the first surface faces a second direction that is opposite the first direction; and
a second hanger section that includes a second surface to abut the first surface and a second tab portion extending in the first direction to define a gap between the first and second tab portions for receiving a suspension component, wherein the second tab portion defines a second mounting hole to align with the first mounting hole, and wherein a fastener is extendable through the first and second mounting holes to mount the suspension component within the gap.

2. The hanger assembly of claim 1, wherein the first hanger section further comprises a recess, and wherein the second tab portion occupies a portion of the recess when the second hanger section is joined with the first hanger section.

3. The hanger assembly of to claim 2, wherein the first surface further comprises a tongue extending into the recess.

4. The hanger assembly of claim 1, wherein the first direction is substantially perpendicular to the first surface.

5. The hanger assembly of claim 1, wherein the second hanger section further comprises at least one finger portion extending from the second surface in a direction opposite the second tab portion.

6. The hanger assembly of claim 5, wherein the first surface includes a first set of mounting holes.

7. The hanger assembly of claim 5, wherein a portion of the first surface and a side surface of the at least one finger together define a seat configured to receive a structure for mounting the hanger assembly.

8. The hanger assembly of claim 5, wherein the at least one finger portion defines a mounting hole for mounting the hanger assembly to a rail.

9. A hanger assembly, comprising:
an inner hanger section that includes a top surface and a first tab portion that defines a first mounting hole and extends in a first direction; and an outer hanger section that includes a bottom surface, a second tab portion that defines a second mounting hole and extends in the first direction, and a finger portion that extends from the bottom surface in a direction opposite the first direction, wherein, when the bottom surface abuts the top surface:

the first and second tab portions define a gap to receive a suspension component; and the first and second mounting holes align to receive a fastener for mounting the suspension component in the gap.

10. The hanger assembly of claim 9, wherein the finger portion and the top surface together define a seat for mounting the hanger assembly.

11. The hanger assembly of claim 9, further comprising a recess in the top surface, where the second tab portion occupies a portion of the recess when the outer hanger section is joined with the inner hanger section.

12. The hanger assembly of claim 11, wherein the top surface further comprises a tongue extending into the recess.

13. The hanger assembly of claim 9, wherein the top surface includes a first set of mounting holes.

14. The hanger assembly of claim 9, wherein the bottom surface is welded to the top surface.

15. The hanger assembly of claim 9, wherein the finger portion defines a mounting hole for mounting the hanger assembly to a rail.

16. A hanger assembly, comprising:

an inner hanger section that includes a top surface and a first tab portion extending from the top surface and defining a first mounting hole; and an outer hanger section that includes a bottom surface and a second tab portion extending from the bottom surface and defining a second mounting hole, wherein, when the inner and outer hanger sections are joined together:

the first and second tab portions define a gap to receive a suspension component; and the first and second mounting holes align to receive a fastener for mounting the suspension component in the gap.

17. The hanger assembly of claim 16, further comprising a recess in the top surface, wherein the second tab portion occupies a portion of the recess when the outer hanger section is joined with the inner hanger section.

18. The hanger assembly of claim 17, wherein the top surface further comprises a tongue extending into the recess.

19. The hanger assembly of claim 16, wherein the top surface includes a first set of mounting holes, and wherein the finger portion includes a second set of mounting holes for the mounting of the hanger assembly.

20. The hanger assembly of claim 16, wherein the outer hanger section further includes a finger portion extending in a direction opposite the second tab portion, and wherein the finger portion defines a mounting hole for mounting the hanger assembly to a rail.

* * * * *